United States Patent [19]

Cross et al.

[11] Patent Number: 4,712,914
[45] Date of Patent: Dec. 15, 1987

[54] DEVICE FOR CHARACTERIZING WIDE ANGLE BEAMS

[75] Inventors: Michael A. Cross, Severna Park; Edward W. Nichols, Reisterstown, both of Md.

[73] Assignee: Westinghouse Electric Corp., Pittsburgh, Pa.

[21] Appl. No.: 817,705

[22] Filed: Jan. 10, 1986

[51] Int. Cl.$^4$ .............................................. G01J 1/00
[52] U.S. Cl. ..................................... 356/121; 356/360
[58] Field of Search ............... 356/121, 122, 359, 360

[56] References Cited

U.S. PATENT DOCUMENTS

| 3,746,449 | 7/1973 | Schick | 356/121 |
| 4,584,484 | 4/1986 | Hutchin | 356/359 |

FOREIGN PATENT DOCUMENTS

| 151881 | 11/1979 | Japan | 356/121 |
| 74407 | 6/1980 | Japan | 356/121 |

OTHER PUBLICATIONS

Knudtson et al., "Laser Beam Spatial Profile Analysis Using a Two-Dimensional Photodiode array", *Rev. Sci Instrum*, vol. 54, No. 7, (Jul. 1983), pp. 856–866.

*Primary Examiner*—R. A. Rosenberger
*Attorney, Agent, or Firm*—R. P. Lenart

[57] ABSTRACT

A system for characterizing miniature optical sources such as laser diodes is disclosed. In its most convenient form the system includes an optical system for collecting a wide angle beam and collimating the beam into substantially parallel rays. In the substantially parallel beam, equal area angular portions of the wide angle beam should correspond to equal areas in the parallel beam. Optical sensors are utilized to generate signals indicative of the intensity of the parallel optical beam. Digital processing is included to calculate the characteristics of the optical beam from the intensity samples of the parallel beam. In one embodiment, a reflecting plane is positioned between the source and the optical system so that Lloyd's fringes are produced in a measurement plane.

6 Claims, 8 Drawing Figures

DEVICE FOR CHARACTERIZING WIDE ANGLE BEAMS

BACKGROUND OF THE INVENTION

1. Field of the Invention

The invention relates generally to a measurement apparatus and more specifically to semi-automatic apparatus for measuring the characteristics of wide beam optical sources.

2. Description of the Prior Art

Prior art apparatus for characterizing wide angle optical beams such as the output of laser diodes has been largely limited to manually operated apparatus. That is to say, typically single point optical detectors were utilized to detect the intensity of the beam by manually positioning the sensor in a known relationship to the source. This procedure was both laborious and sometimes inaccurate.

A system for analyzing high power optical beams is disclosed in U.S. patent application Ser. No. 547,603, titled "Optical Beam Analyzer" and assigned to the same assignee as this application.

SUMMARY OF THE INVENTION

The invention comprises a method and apparatus for semi-automatically characterizing the optical beams of small sources such as laser diodes. An optical system capable of accepting wide beam inputs is utilized to project the optical output signal of the source to be characterized such that equal areas on an imaginary spherical surface having a center coincident with the center of the optical source are projected into equal areas on a planar surface normal to the optical axis of the projection system. A linear array of optical detectors is utilized to sample the intensity of the projected beam and to generate data related to the intensity profile of the beam. This data is digitized and processed to determine the characteristics of the optical beam.

In the experimental embodiment it was found convenient to use a symmetrical biconvex lens as the primary component of the optical system. By utilizing such a lens it is possible to position the optical source to be analyzed at a distance from the surface of the lens which is substantially less than one focal length of the lens. For a given F number and source beam angle, this arrangement permits collection of a larger portion of the total energy emitted than if the source was located at the focal distance, as is usual. The array of optical detectors utilized to generate data indicative of the intensity profile of the projected beam is placed as close as physically convenient to the second surface of the lens. Such an arrangement permits the optical output of a wide angle source to be collected and projected by a lens having a modest diameter. This arrangement avoids the physical complexity of multi-element lenses as well as the possibility of optical problems which might result from the reflections that such a system tends to generate. This projection technique automatically takes into account the spherical aberration of the lens since the fact that the lens is spherical is taken into account in the projection calculations. Additionally, the projection reduces the length of the array of photosensors because the divergent emitted beam is converted to beams having less divergence.

The preferred embodiment of this invention utilized the data processing techniques and apparatus which are disclosed in copending U.S. patent application Ser. No. 547,603. The subject matter of that application is incorporated by reference.

DESCRIPTION OF THE PREFERRED EMBODIMENT

Figure 1:
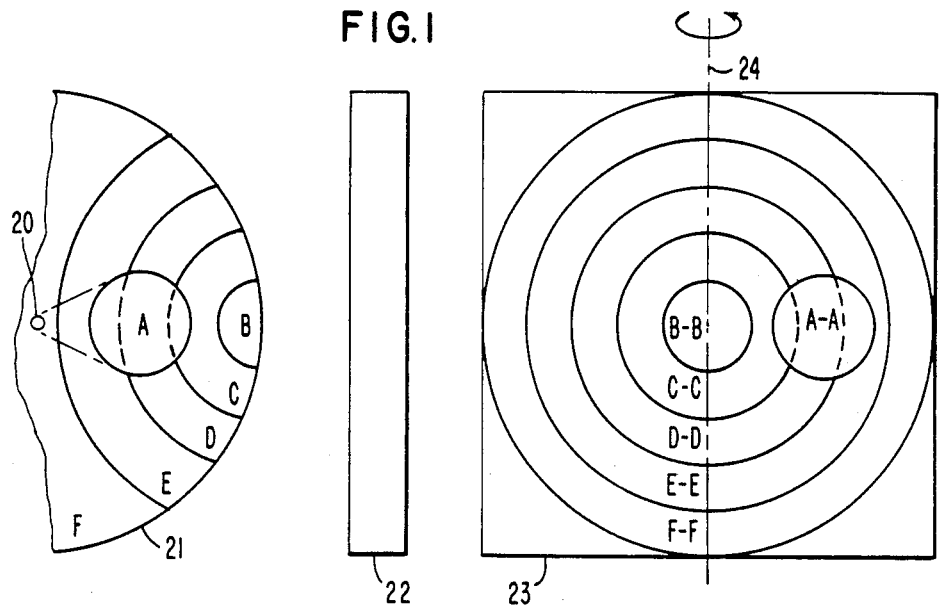
FIG. 1 is a drawing illustrating the desired optical characteristics of the system.

FIG. 1 is a diagram illustrating the desired optical characteristics of the system. More specifically, the system is designed to determine the characteristics of wide angle optical beams from a source such as a laser diode 20 using a linear array of photosensors to scan a projected image of the beam in a flat projection plane 23. As is well known, the optical output beam of typical laser diodes may have a rather wide beam width with the beam structure of interest extending over an angle approaching one radian.

Functionally, the system utilizes a projection system 22, positioned sufficiently close to the source 20, so that substantially all of the energy comprising the beam will impinge upon the projection system 22. The characteristics of the projection system 22 are selected such that the power density in watts per square cm. determined using spherical coordinates, for example, along an imaginary spherical surface, illustrated in fragmentary form at reference numeral 21, of the input beam is converted into a beam having the same power density in watts per square cm. in a real flat projection plane 23.

More specifically, area "A" on spherical surface 21 is projected onto area "A—A" in projection plane 23. Similarly, areas "B through F" are respectively projected onto areas [(B—B)-(F—F)] in projection plane 23. In this process, a one-to-one relationship between the watts per cm. sq. on spherical surface 21 and the corresponding area in the flat projection plane 23 is substantially maintained.

Figure 2:
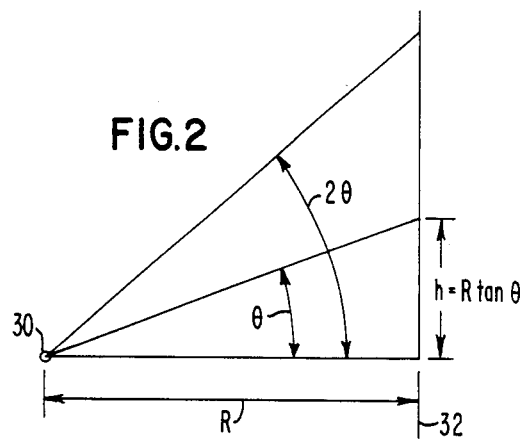
FIG. 2 is a drawing illustrating the flat plane projection characteristics of a divergent beam in the absence of an optical projection system.

FIG. 2 is a diagram further illustrating the desirability of including the projection apparatus 22. For example, if a laser diode source 30 is positioned at a distance from a projection plane 32, a ray at an angle $\theta$ from the horizontal will be projected on the screen with the height "h" being a non-linear function of angle $\theta$. This clearly illustrates that for equal angular increments of $\theta$, a given surface area segment on a spherical surface having a center coincident with the light source 30 will not be projected as an equal area in the flat projection plane. Thus, there is a non-linear relationship between the power density of the beam and the power density of the projected beam in the sensor plane 32. This non-linearity complicates any attempt to characterize the beam by sampling its intensity at a series of known locations with the locations positioned in a flat plane.

Figure 3:
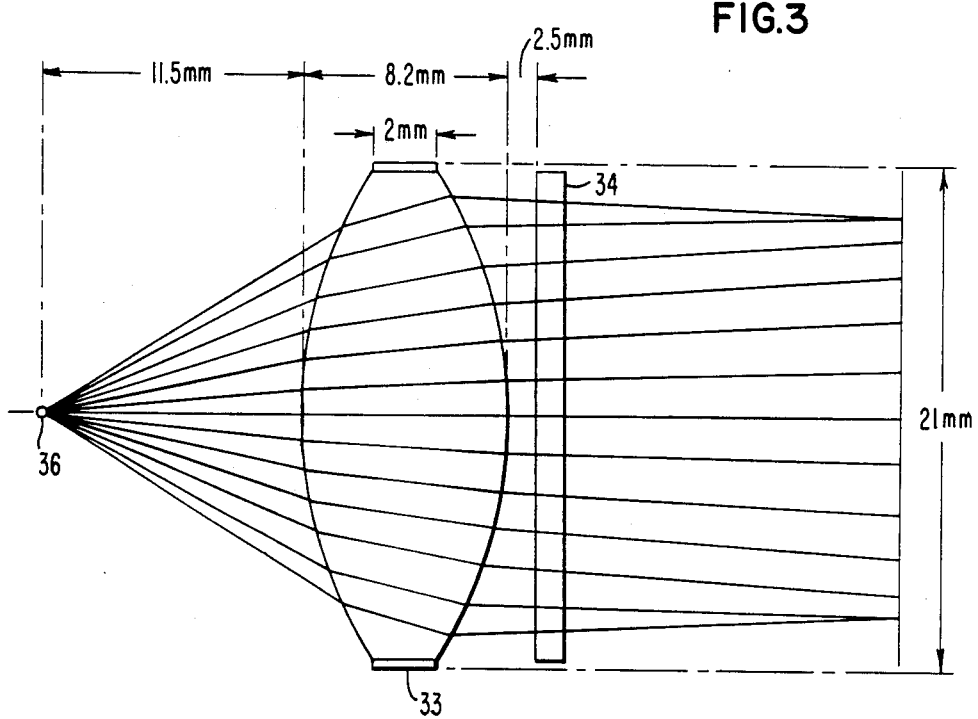
FIG. 3 is a diagram of the optical projection characteristics of the system utilized in the experimental model of the invention.

To further illustrate the operation of the system comprising the invention and to provide a basis to show mathematically that the system is feasible using a simple lens system, the lens 33 used in the experimental model and its optical projection characteristics are illustrated in FIG. 3. The lens 33 is biconvex having a maximum thickness of 8.2 millimeters and a focal length of 20 millimeters. An array of photodetectors 34 is positioned parallel to the lens 33 and 2.5 millimeters from a surface thereof. A point source such as a laser diode 36 is positioned substantially on the optical axis of the lens 33 and 11.5 millimeters from the second surface of the lens 33. Calculations were made for the necessary projection radius in the projection plane for angular increments ranging from 0.2 to 1.2 radians. The desired radial increments for equal power density projection and the achieved radial distances in the projection plane are shown in tabular form below for angular increments up to 1.20 radian:

TABLE I

| RAY ANGLE OF SOURCE | | PROJECTED RADIUS, MM ON PLANAR PROJECTION | | INCIDENCE ANGLE AT ARRAY |
|---|---|---|---|---|
| DEGREES | RADIANS | REQUIRED FOR EQUAL AREAS | ACHIEVED | DEGREES |
| 11.4 | .20 | 1.599 | 1.601 | 88.3 |
| 22.9 | .40 | 3.195 | 3.203 | 86.9 |
| 33.4 | .60 | 4.782 | 4.803 | 86.1 |
| 45.8 | .80 | 6.357 | 6.392 | 86.3 |
| 57.3 | 1.00 | 7.917 | 7.943 | 88.6 |
| 68.8 | 1.20 | 9.457 | 9.293 | 97.2 |

As can be seen from the above Table, within the full beam width of about 1 radian there is very good linearity between areas on the desired and the required radial distance in the projection plane. Additionally, the light energy arriving on the detector array 34 arrives at substantially 90° with respect to the surface of the array 34. This permits a mask with a very narrow slit to be positioned in front of the array 34 to protect other light sensitive circuitry which is constructed in the same substrate as the detector array 34. If sensor arrays less susceptible to performance degradation due to light impinging on portions of the substrate not utilized by the sensors become available, the importance of this feature is reduced.

These calculations show that for a given F number of the lens 33 and source beam angle, this arrangement permits collection of a larger portion of the total energy emitted from source 36 than if the source 36 were located at the focal distance from lens 33, as is usual. The above calculation also takes into account the spherical aberration of the lens 33, illustrating that the desired projection characteristics are achievable using a simple lens system, such as a single biconvex lens, for example.

Figure 4:
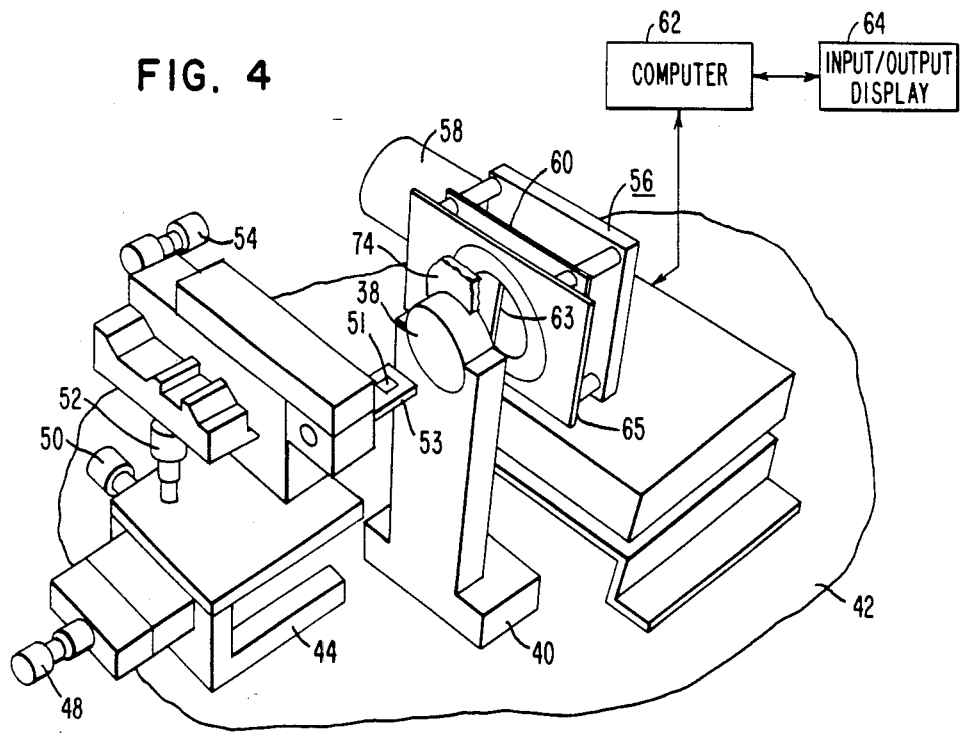
FIG. 4 is a somewhat schematic illustration of the apparatus comprising the invention.

FIG. 4 is a somewhat isometric diagram illustrating the physical apparatus comprising the preferred embodiment of the invention and one of its uses. A laser diode source 51 whose output beam is to be analyzed is positioned on a reflecting surface 53 such that portions of the output beam of the laser diode 51 are reflected by surface 53 and enter the lens assembly 38. Other portions of the light output of the laser diode 51 are radiated at an angle such that they enter the lens 38 without being reflected by reflecting surface 53. (The reasons for the reflecting surface 53 are subsequently explained). The lens system 38 is supported by a post-like support member 40 which is bolted securely to a base plate 42. A multiaxis positioning system 44 supports the laser diode 51 and the reflecting surface 53. A first micrometer 48 permits the laser source 51 to be moved substantially parallel to the optical axis of the lens system 38. Similarly, the laser source 51 can be moved horizontally and at an axis approximately 90° with respect to the axis of the lens 38 by a second micrometer 50. A third micrometer 52 permits the laser diode 51 to be moved vertically with respect to the lens 38. Laser diode 51 is positioned precisely with respect to the lens 38 by a fourth micrometer 54. This micrometer adjustment will be discussed in more detail later.

A motor driven stepping system 56 is positioned behind the lens assembly 38 and provides support for a circuit board 60 on which the array of detectors (not illustrated in this Figure) and the associated electronic circuitry is mounted. A substantially flat plate 65 having a vertical slot 63 therein is also mounted on the stepping system 56. This stepping system 56 is driven by an electric stepping motor 58 causing the array of detectors which is mounted on a circuit board 50 to scan across the projected beam of the laser diode 51, as projected through the lens system 38 and a slot 63 in flat plate 65. A digital computer 62 is coupled to the motor driven stepper 56 and to the array of detectors. To collect data relating to the characteristics of the output beam of laser diode 51, the computer 62 issues stepping and sampling commands causing the array of detectors to be scanned in discrete increments and the output signals of the array of detectors to be sampled and digitized to generate data having a known relationship to the intensity profile of the output beam of the laser 51. Conventional display and input/output output devices 64 are coupled to the digital computer 64 to generate displays and control the operation of the system.

Figure 5:
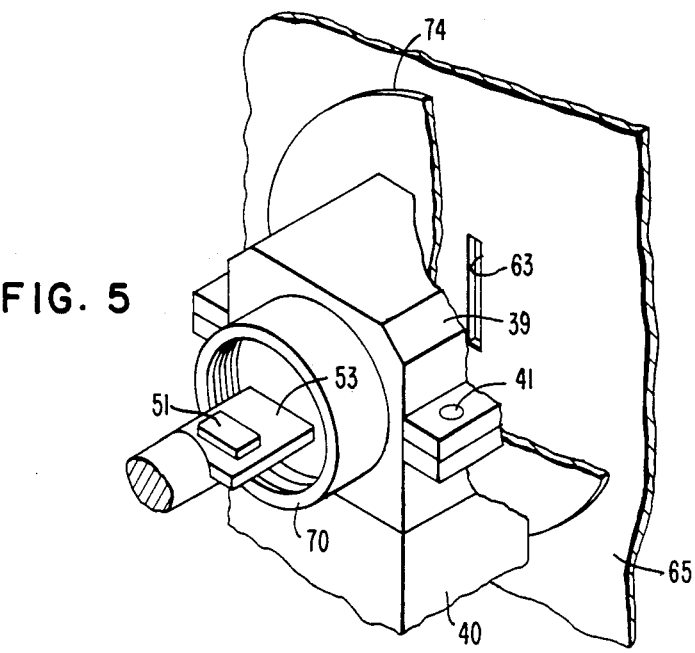
FIG. 5 is a diagram illustrating the lens system and apparatus for supporting a light source whose output beam is to be analyzed.

FIG. 5 is a more detailed view of the lens assembly 38. The upper end of bracket 40 includes a semicircular groove with the support tube 70 held in place by a cap 39. Cap 39 is secured to bracket member 40 by four screws, two on each side, with one of the screws illustrated at reference numerals 41.

Figure 6:
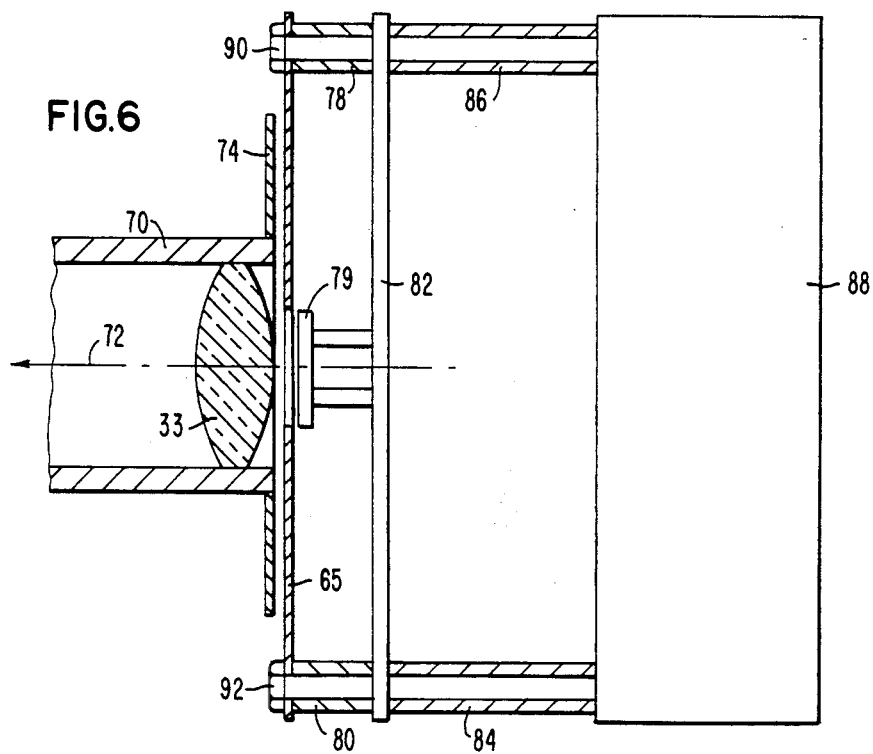
FIG. 6 is a horizontal cross-section taken through the lens and scanning apparatus.

FIG. 6 is a horizontal cross-section view of the system except for the apparatus for mounting and positioning the light source to be characterized. The lens 33 (FIG. 6) is mounted in a support tube 70 using any convenient means. A light source, such as the laser 51 (FIG. 4) is positioned on the optical axis 72 and in front of the lens 33 as illustrated in more detail in FIG. 4. A first light shield 74 is affixed to one end of the tube 70.

Positioned approximately 0.030 inches from the first light shield 74 is a second light shield 65. A detector array 79 is positioned in a slot 63 (FIGS. 4 and 5) near the center of the second light shield 65 with the array slit mask flush with the surface of light shield 65.

Two spacers 78 and 80 (FIG. 6), hold the light shield 65 a fixed distance from and substantially parallel to a circuit board 82 on which the array of detectors 79 and other conventional electronic circuitry necessary to make the system function, as intended and described, is mounted. Additional spacers, 84 and 86, hold the circuit board 82 substantially parallel and a fixed distance from motor driven positioner 88. Two bolts, 90 and 92, pass through light shield 65, spacers 78, 80, 84 and 86, circuit board 82 and screw into the positioner 88 holding all of these composites in the desired relationship to each other. The positioner is then secured to the base plate 42 (FIG. 4) to hold the array 79 in the proper position.

Detector array 79 has a length substantially equal to the diameter of the lens 33. Positioner 88 is designed to move the array of detectors 79 left and right to scan a plane parallel to the lens 33 and substantially equal to the cross-section area of lens tube 70. This permits the array of detectors 79 to be positioned to sample the entire output beam of the light source as projected by lens 33.

Array 79 may conveniently be a standard photo detector array type no. RL1024G available from Reticon.

Figure 7:
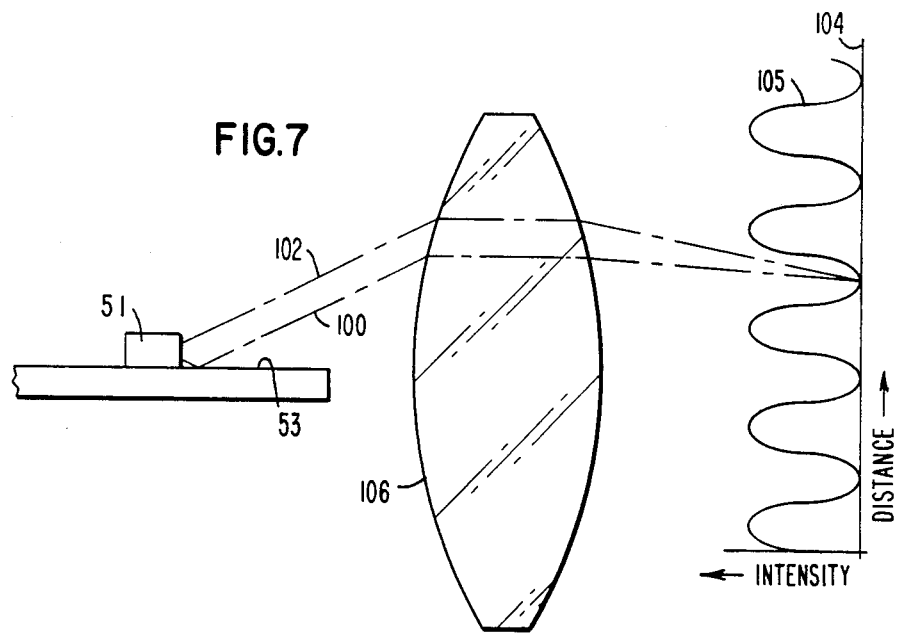
FIG. 7 is a diagram illustrating the intensity characteristics of a projected beam of a wide angle source positioned on a reflective surface.

FIG. 7 is a somewhat schematic diagram illustrating the laser diode 51 mounted on the reflection surface 53 which was previously discussed with reference to FIG. 4. To illustrate the operation of the system, two typical rays 100, 102 of the light beam emitted by laser source 51 are illustrated. For example, the first ray 100 impinges on the reflecting surface 53 at a relatively sharp angle and is deflected to a point near the center of the lens 106. Lens 106 refracts this ray such that it emerges at an angle with respect to the optical axis of the lens 106. The second ray 102 is emitted at an angle such that it does not impinge on the reflecting surface 53. The second ray 102 is emitted at an angle such that it impinges on the lens 106 without being reflected.

From FIG. 7, it is obvious that various light rays comprising the beam which impinges on the lens 106 travel different distances due to being reflected from the surface 53. This generates Lloyd's fringes in the projection plane 104 permitting various useful calculations to be made. The intensity profile of the Lloyd's fringes in the output beam is illustrated by a curve 105. The curve 105 periodically has maximum and minimum values. From this information the wavelength of the light as well as the height of the emission region of laser diode 51 from the reflecting surface 53 can be calculated using well known techniques. An auto correlation function can be advantageously used to find the distance between the fringes of the beam emitted by the laser diode 51. This function is very useful in that it is not subjected to the inconvenient calculations that are present when attempts are made to calculate these distances using Fourier analyses. Additionally, this technique also gives an average distance between all the fringes automatically. These average values permit, the wavelength and height of the laser source above the reflecting surface to be more accurately calculated. Additionally, the intensity profile of the output beam of the laser source can be calculated. Other calculations are also possible because there is a fixed relationship between the beam in the projection plane and the beam as it is transmitted by the source.

Figure 8:
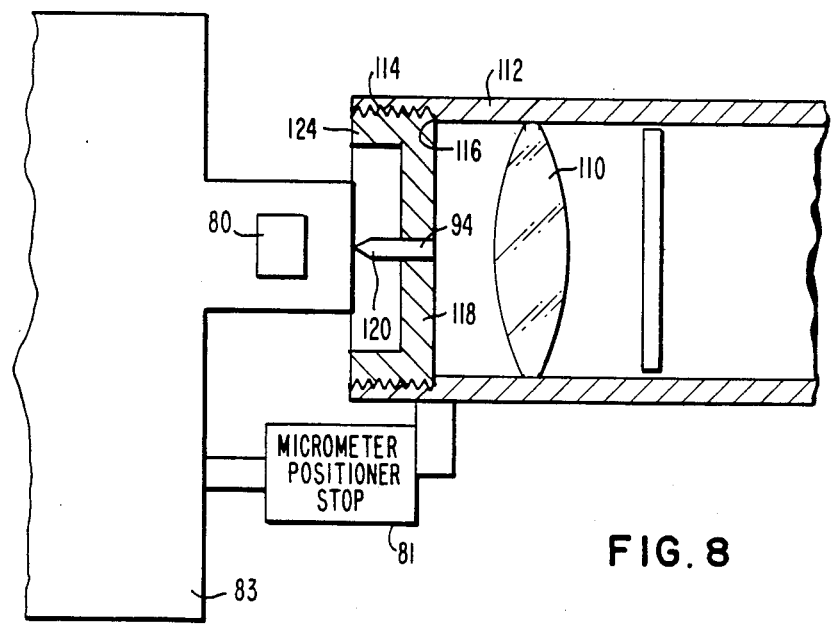
FIG. 8 is a diagram in cross-section illustrating the apparatus for accurately positioning a light source whose characteristics are to be determined with respect to the other components of the system.

FIG. 8 is a more detailed diagram illustrating schematically the apparatus and method for positioning a laser diode 80 a precise and known distance from the surface of the lens 110 as required for the system to operate, as described above. More specifically, the lens 110 is secured in a fixed location in a tube-like support 112 using any convenient technique as previously described. Near the entrance side of the tube member 112, the tube member includes an internally threaded portion 114 which terminates near a shoulder portion 116. A cup-shaped member 118 has threads on its outer surface to mate with the internally threaded portion 114. A needle-like member 120 is mounted in the bottom portion of the cup-like member 118. The upper edge portion 124 of the cup member 118 and the extending end portion of the needle 120 are lapped to form a common and flat surface. When the cup member 118 is screwed totally into the tube-like mounting member 112, the pointed end portion of the needle member 94 defines a precise location with respect to the surface of the lens 110.

The support structure plate to which the laser diode 80 is mounted includes a micrometer stop functionally illustrated at reference No. 81. (This micrometer is illustrated in more detail in FIG. 4). The upper portion of the support structure includes a spring-loaded track structure which permits the laser diode 80 to be moved horizontally along the optical axis of the lens 110 from the lens by compressing the spring. Thus, the micrometer stop 81 is adjusted until the support member 83 just touches the end of the needle member 120. This defines a precise distance from the laser diode 80 to the lens 110 as previously discussed. From the readings on the micrometer included in micrometer stop and the second micrometer included in the diode support structure, previously described, the distance between the laser source 80 and the lens 110 can be calculated provided the distance from the laser diode exit face to the interface plane at the point of contact between needle member 120 and support member 83 has been accurately predetermined.

Once the diode 80 has been positioned precisely with respect to the lens 110 as described above the spring holding the laser diode against the needle member 120 is depressed and the cup member 118 is removed from the support tube 112. The spring is then allowed to reposition the laser diode to its original and known position by permitting the spring to force the diode back to its original position. Micrometer 48 (FIG. 4) is then used to advance the laser diode and support extension into the tube 112 (FIG. 8) a calibrated distance which is read from the micrometer 48 gradations. The distance advanced is calculated using the known separation of the lens 110 and laser diode 80 exit face and substantially the known separation of the vertex of lens 110 and ideal source location determined from the projection analysis (e.g. 11.5 mm).

The apparatus comprising the invention can be constructed using conventional construction techniques. Data processing, display and control functions can be provided by conventional apparatus. Although the invention has been illustrated with respect to analyzing (characterizing) the output beam of a laser diode, optical beams from other sources may also be analyzed. In analyzing other optical beams or in analyzing output beams of laser diodes using techniques other than those disclosed, the reflecting surface 53 (FIG. 7) may not be required. Other applications and modifications of this system are also possible. For example an area array could be used and no mechanical scanning would be required. However, such an array would require a more complex electrical signal processing technique to be used to achieve the same overall performance.

We claim:

1. A system for determining the characteristics of an optical beam comprising, in combination:
   (a) optical projection means for collecting optical energy comprising a divergent optical beam and for projecting energy comprising said optical beam into a planar projection plane such that a substantially linear relationship is maintained between the energy density of said optical beam when measured in equal solid angular increments at a constant distance from the centroid of said optical beam and the energy density in said projection plane;
   (b) sensor means for determining the energy density of said optical beam at predetermined location in said projection plane to generate a data matrix having a predetermined relationship to the characteristics of said optical beam;
   (c) data processing means for processing said data matrix to determine selected characteristics of said optical beam; and
   (d) a reflecting plane positioned between a source generating said optical beam and said optical projection means such that Lloyd's fringes are produced in said projection plane.

2. A system for determining the characteristics of an optical beam in accordance with claim 1 wherein said optical projection means comprises a biconvex lens.

3. A system for determining the characteristics of an optical beam in accordance with claim 2 wherein said sensor means comprises a linear array of detectors with said linear array having a length substantially equal to the diameter of said biconvex lens.

4. A system for determining the characteristics of an optical beam in accordance with claim 3 wherein said system also includes positioning means for positioning said linear array of detectors at selected locations in said projection plane in response to position signals generated by a digital computer.

5. A system in accordance with claim 1 further including data processing means for processing said data matrix to determine the height of said optical beam above said reflecting plane.

6. A system in accordance with claim 1 further including means for positioning a source for generating said optical beam at a known location with respect to said projection means comprising:
   (a) mechanical support means for mounting said source, said mechanical support means including a reference surface such that when said source is mounted, the distance between said source and said reference surface can be determined;
   (b) reference means affixed to said projection means; and
   (c) positioning means for positioning said reference surface in mechanical contact with said reference means such that said reference means can be removed from said projection means with said reference surface being in substantially the same position before and after removal of said reference means.

* * * * *